UNITED STATES PATENT OFFICE.

HENRY ARMAND JOSEPH MANOURY, OF PARIS, FRANCE.

MANUFACTURE OF SUGAR.

984,578.      Specification of Letters Patent.     Patented Feb. 21, 1911.

No Drawing.     Application filed November 4, 1909. Serial No. 526,178.

*To all whom it may concern:*

Be it known that I, HENRY ARMAND JOSEPH MANOURY, a citizen of the Republic of France, and a resident of 11$^{bis}$ Rue de Surène, Paris, France, have invented certain new and useful Improvements in the Manufacture of Sugar, of which the following is a full, clear, and exact description, such as will enable others skilled in the art to which it appertains to carry out the same.

In the process of extraction of sugar by diffusion it has been hitherto a common practice to pass a current of water through a succession of vessels containing the beet cuttings or other raw material, whereby there is obtained a progressively stronger and stronger solution containing on the one hand crystallizable sugar and on the other hand the non-crystallizable sugar and the various impurities which compose the molasses. By a variety of well known chemical processes a certain proportion of sugar has been hitherto extracted from the molasses; after which the remainder could only be made useful by evaporation and incineration of the residue to obtain the salts it contains. It follows that there has been hitherto obtainable from beet cuttings, crystallizable sugar, a forage for cattle of relatively low nutritive power, and a small proportion of potash salts. The expense of the processes above outlined is considerable, and they involve a waste of valuable nutritive matter in the solids which are incinerated for extraction of the potash salts.

It is the object of my present invention to provide a process whereby the nutritive impurities of the molasses including the non-crystallizable sugar are returned into the beet cuttings during their last stage of diffusion treatment, thus avoiding a great part of the expense of the prior processes and obtaining a much more valuable forage than hitherto. For this purpose I take advantage of the peculiarities common to prior diffusion processes.

It has been hitherto common to pass the pure water used for diffusion first into a vessel containing those cuttings which are most nearly exhausted by prior diffusion, and then successively through less and less exhausted cuttings, until lastly the freshly cut beets are reached. By this means the extracting power of the diffusion liquid is maintained, in spite of the continually increasing strength of the solution. The nearly exhausted beets to which the entering diffusion current is supplied I term the last cuttings, and it is into these that I propose to return or reintegrate the nutritive impurities which have been wasted in the course of earlier and more expensive processes. For this purpose, instead of supplying pure water to these last cuttings, I substitute at this point what may be termed "by-product liquids" resulting from subsequent stages of the process. These liquids may consist of some or all of the following classes: 1st the dilute emptyings of the various diffusers. 2nd the juices flowing from the presses wherein the forage is compressed. 3rd the molasses, or else the liquor remaining after chemical extraction of sugar from the molasses. In addition to the by-product liquid so used, a proper proportion of pure water may be added if necessary at any desired stage of diffusion, depending upon a variety of circumstances well known to those skilled in the art.

Before using the by-product liquids they are stirred, clarified and filtered, and a suitable proportion of antiseptic substance is preferably added to prevent alteration of the sugar. In case the by-product liquid contains much lime or similar substance resulting from chemical treatment of the molasses, it will be necessary to neutralize this ingredient with carbonic, sulfuric or phosphoric acid. Inasmuch as the "last cuttings" which have been nearly exhausted by previous diffusion, contain a much smaller proportion of valuable impurities than the by-product liquid which passes through them, this liquid will give up to these cuttings the impurities contained in solution, in accordance with the laws of osmose, until the proportions are balanced between the cuttings and the liquid. At the same time, since the by-product liquids contain practically no crystallizable sugar, they will serve to extract such sugar from the "last cuttings" as efficiently as pure water, and will simultaneously return to the cuttings a large proportion of non-crystallizable sugar together with the other nutritive impurities. It will thus be seen that, by use of my process, I do away with the waste and expense incident to evaporation of the liquid remaining after chemical treatment of the molasses and at the same time obtain a much richer and more nutritive food product resulting from compression of the enriched "last cuttings."

While my process is herein described as used for extraction of sugar from beets, my invention will apply to any diffusion process having as a by-product a forage for animals.

What I claim is:

1. The process of enriching the forage by-product obtained from extraction of sugar by a diffusion process which consists in returning some or all of the by-product liquids to the vessel containing the nearly exhausted cuttings, substantially as described.

2. The process of enriching the forage by-product obtained from extraction of sugar by a diffusion process which consists in returning into the current of diffusion liquid beginning with the nearly exhausted cuttings the liquid remaining after the usual chemical treatment of the molasses for extraction of crystallizable sugar therefrom, substantially as described.

In witness whereof I have hereunto set my hand in the presence of two witnesses.

HENRY ARMAND JOSEPH MANOURY.

Witnesses:
FRANÇOIS DU BOISROUDRAY,
HANSON C. COXE.